US010089146B2

(12) United States Patent
Chougule et al.

(10) Patent No.: US 10,089,146 B2
(45) Date of Patent: Oct. 2, 2018

(54) WORKLOAD BALANCING FOR STORLET INFRASTRUCTURE

(71) Applicant: International Business Machines Corporation, Armonk, NY (US)

(72) Inventors: Brijesh Chougule, Pune (IN); Sasikanth Eda, Vijayawada (IN); Deepak R. Ghuge, Sangamner (IN); Sandeep R. Patil, Pune (IN); Sanjay K. Sudam, Pune (IN)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 15/087,533

(22) Filed: Mar. 31, 2016

(65) Prior Publication Data

US 2017/0286178 A1 Oct. 5, 2017

(51) Int. Cl.
*G06F 9/46* (2006.01)
*G06F 9/455* (2018.01)
(Continued)

(52) U.S. Cl.
CPC ........... *G06F 9/50* (2013.01); *G06F 9/455* (2013.01); *G06F 9/45533* (2013.01); *G06F 9/45558* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/4875* (2013.01); *G06F 9/4881* (2013.01); *G06F 9/505* (2013.01); *G06F 9/5005* (2013.01); *G06F 9/5011* (2013.01); *G06F 9/5016* (2013.01); *G06F 9/5022* (2013.01); *G06F 9/5027* (2013.01); *G06F 9/5044* (2013.01); *G06F 9/5055* (2013.01); *G06F 9/5083* (2013.01); *G06F 9/5088* (2013.01); *G06F 2009/4557* (2013.01); *G06F 2009/45575* (2013.01); *G06F 2209/501* (2013.01)

(58) Field of Classification Search
None
See application file for complete search history.

(56) References Cited

U.S. PATENT DOCUMENTS 9,350,681 B1 * 5/2016 Kitagawa ............... H04L 47/70
2009/0293022 A1 11/2009 Fries
(Continued)

OTHER PUBLICATIONS

Mell et al., "The NIST Definition of Cloud Computing: Recommendations of the National Institute of Standards and Technology," Special Publication 800-145, National Institute of Standards and Technology, Sep. 2011, 7 pages, Gaithersburg, MD.

*Primary Examiner* — Charles M Swift
(74) *Attorney, Agent, or Firm* — Daniel C. Housley

(57) ABSTRACT

A first storlet engine is monitored for a first computational algorithm. The storlet engine includes a lookup table including a first characteristic of one or more nodes, a parser unit, and a resource availability monitor. The first computational algorithm is parsed into an abstract syntax tree using a parser unit. A first category of the first computational algorithm is determined by analyzing the abstract syntax tree. A first node of the lookup table with the first characteristic matching the first category for processing the first computational algorithm is identified based on the first category of the computational algorithm. The first computational algorithm is sent to the first node for processing.

19 Claims, 7 Drawing Sheets

(51) Int. Cl.
*G06F 15/173* (2006.01)
*G06F 9/50* (2006.01)
*G06F 9/48* (2006.01)

(56) References Cited

U.S. PATENT DOCUMENTS

| | | | |
|---|---|---|---|
| 2010/0169253 A1* | 7/2010 | Tan | G06F 9/5088 |
| | | | 706/21 |
| 2011/0055494 A1 | 3/2011 | Roberts et al. | |
| 2011/0320556 A1* | 12/2011 | Reuther | G06F 9/4856 |
| | | | 709/213 |
| 2013/0031536 A1* | 1/2013 | De | G06F 8/427 |
| | | | 717/146 |
| 2013/0067476 A1* | 3/2013 | Rosenberg | G06F 9/4843 |
| | | | 718/100 |
| 2013/0159376 A1* | 6/2013 | Moore | H04L 67/10 |
| | | | 709/202 |
| 2013/0219385 A1* | 8/2013 | Geibel | G06F 9/45558 |
| | | | 718/1 |
| 2013/0346615 A1* | 12/2013 | Gondi | G06F 9/5016 |
| | | | 709/226 |
| 2014/0047342 A1 | 2/2014 | Breternitz et al. | |
| 2014/0359587 A1* | 12/2014 | Villadsen | G06F 8/41 |
| | | | 717/143 |
| 2015/0019599 A1 | 1/2015 | Olderdissen et al. | |
| 2015/0154011 A1* | 6/2015 | Ceng | G06F 8/51 |
| | | | 717/137 |
| 2016/0062753 A1* | 3/2016 | Champagne | G06F 8/51 |
| | | | 717/137 |
| 2016/0078388 A1* | 3/2016 | Himmelreich | G06Q 10/06375 |
| | | | 709/224 |

* cited by examiner

WORKLOAD BALANCING FOR STORLET INFRASTRUCTURE

BACKGROUND

Aspects of the present disclosure relate to workload balancing; more particular aspects relate to balancing a storage environment using an object service workload balancing. Object service workload balancing may employ a storlet infrastructure for leveraging node computational categories, past performance, and security records for the processing of a computational algorithm.

Object service storage environments allow for addressing and processing discrete units of data, called objects. One or more objects may be stored within a storage pool, and may be accessed via a unique identifier (unique ID or unique NAME) that allows an end user to retrieve the objects. The objects may be retrieved and read by the end user.

SUMMARY

According to embodiments of the present disclosure, a method, a system, and a computer program product are proposed for determining a first node for processing a computational algorithm. A storlet engine may determine the first node from a lookup table by matching a first characteristic of the computational algorithm with a first category of a first node.

Embodiments provide a method for monitoring for a first computational algorithm with a storlet engine. The storlet engine includes a lookup table including a first characteristic of one or more nodes, a parser unit, and a resource availability monitor. The first computational algorithm is parsed into an abstract syntax tree using a parser unit. A first category of the first computational algorithm is determined by analyzing the abstract syntax tree. A first node of the lookup table with the first characteristic matching the first category for processing the first computational algorithm is identified based on the first category of the computational algorithm. The first computational algorithm is sent to the first node for processing. A system including a memory, a processor device, a parser unit, and a proxy node, as well as a computer program product are also disclosed herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
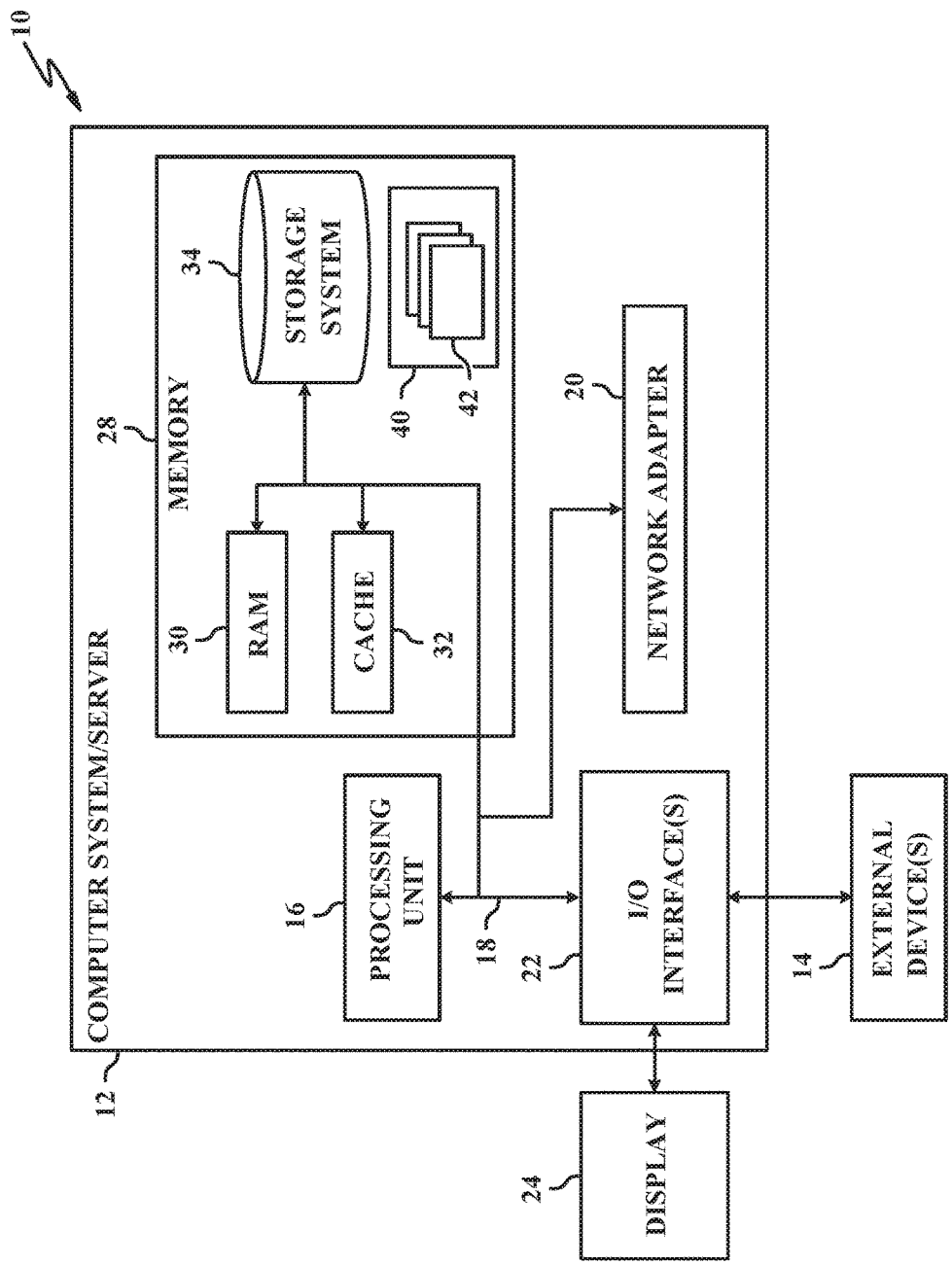
FIG. 1 depicts a cloud computing node, according to various embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to object storage, and more specifically, relate to balancing workloads of one or more nodes within the object storage environment. The access and execution of the object storage environment may be balanced using a computational module (e.g., a storlet) to gather relevant metadata to determine an optimal processing node within the object storage environment. While the present disclosure is not necessarily limited to such applications, various aspects of the disclosure may be appreciated through a discussion of various examples using this context.

Aspects of the present disclosure relate to various algorithms that may assist in optimizing a workflow of a storlet (e.g., an embedded compute infrastructure within object storage) as well as enhancing reliability and security by leveraging performance evaluation reports, certificated preferences, and past experience. A storlet is a computational storage unit that may be triggered by events (e.g., PUT or GET operations) on their associated metadata attributes. Storlets may be loaded on an object storage node as an object. Storlets are dynamically loadable code, which may bring the computation to the data. Storlets are a unit of computation where required computations are brought to the data instead of moving the data to a processing unit (e.g., compute node, server, or central processing unit (CPU)) to process the computation. Storlets may include traditional object storage architecture, storlet embedded object storage architecture, and/or performance reports. The storlet may analyze a deployed computational algorithm and determine an optimal storage node for processing (e.g., executing) the computational algorithm. Storlets may also reduce the amount of data transfer over the network transfers by processing the computational algorithms on the storage node. The implementation of the storlet is further described herein.

Storlets may be computational modules, which may be uploaded dynamically to an object storage server. The storlets may run within the storage unit close to the data objects. Storlets may be executed and tested within a sandbox when not trusted by the environment. Storlets may act as an analog access to stored procedures in databases. The storlet environment may include a scheduler algorithm/framework to enhance security, users trust, improves computation performance, and/or reduce workload on the storage unit in a multi-vendor commodity object storage environment. For example, the storlet environment may enhance security by running the storlet within a VM. The storlet operating within the VM may not access the object storage or not allow computational algorithms to access an object storage node without being assigned to the object storage node. In an additional example, the storlet environment may enhance users trust by allowing the storlet to operate within a sandbox. The sandbox may restrict the storlet to specific nodes that the user may allow the storlet to access.

A storlet may be enabled by augmenting an object storage system with a storlet engine. The storlet engine may allow the object storage system to go from storing only data to being able to produce value from the data stored within the object storage nodes by utilizing a storlet as a middleware within the object storage node. The storlet engine may provide the capability for a storlet to run on the object storage system. In various embodiments, the storlet may be run within a secure sandbox to insulate the storlet from the rest of the system and/or other storlets. The secure sandbox may be a mechanism for separating programs running within a same system, by providing a tightly controlled set of resources to the storlet. The secure sandbox may block undesirable actions from the storlet (e.g., directly accessing cloud storage or communicating outside of the machine). The sandbox may also limit access to local file systems or local ports within the object storage system.

The storlet engine architecture may include an extension service and an execution service. The extension service may connect to an object storage and may determine if a storlet should be initiated. Upon a determination that a storlet may be initiated, the execution service may determine the optimal storlet, and may securely initiate the storlet. The execution service may be positioned in strategic locations within the object storage system to determine if requests match an information field of one or more predefined rules of a storlet. If a request for an information field matches a predefined rule of a storlet, then the storlet may be executed through the execution service.

A storlet engine may support a plurality of execution services in a plurality of storlet programming languages. A storlet engine may also be located in an input/output (I/O) interface node (e.g., a proxy node) or within a storage local node (e.g., storage node). An example object storage architecture may utilize two types of nodes (also referred to as entities). A "proxy" node may be used for distributed load handling, wherein the proxy node may distribute objects to one or more storage nodes within an object storage environment. The proxy node may also handle requests of the storage nodes into a namespace. Another node type may be called a "storage" node, which may write to the various storage subsystems (e.g., disks).

Object service storage environments may allow for addressing and processing discrete units of data called objects. Each object may be identified with its own unique identification (unique ID or unique NAME) and may be self-contained. The unique ID may be a pointer, which may relate to a specific object that may be within a storage pool. The storage pool may contain one or more data objects for processing. A computational algorithm may request a data object within an object storage node. For example, the storage pool may be a collection of object storage nodes connected to a proxy node. For the computational algorithm to be processed, the computational algorithm may request that an object stored on one of the storage nodes connected to the proxy node. The computational algorithm may be distributed from the proxy node to the storage node containing the object. The storlet of the storage node may execute the computational algorithm. The results of the executed computational algorithm may then be returned to the user.

The storage nodes may serve as storage units or repositories, and may assist in an analysis of computational algorithms by extracting information from raw data residing in storage subsystems. Traditionally the architecture would utilize an additional client or node in order to compute data. A storlet proxy node may provide access to one or more storage systems within the storage environment. In various embodiments, the storlet engine may be positioned within the storage interface node if the execution requires an increased amount of data-processing storlets. In various embodiments, storlets may be positioned within a proxy node if the execution requires an increased amount of compute intensive (e.g., resource intensive) storlets or storlets that access several objects within different object storage nodes may be requested.

A storlet engine may run one or more storlets, according to various embodiments, and may operate along with various software (e.g., middleware). In order to address various inefficiencies, a storlet engine may be utilized in an object storage environment, and the storlet engine may utilize one or more storlets. A storlet may be a computation module that may be dynamically uploaded e.g., the storlet may be transferred to an object storage node from another node without interrupting an ongoing process. A storlet may include embedded computing infrastructure within an object storage environment. A storlet may also serve to offload data-intensive computations to where data may be stored, instead of data being processed in a single location. A storlet may run within a storage unit or medium, proximate to various data. According to various embodiments, a storlet may be executed in a sandbox when not trusted. A storlet may be viewed as an analog to stored procedures in databases. A storlet may add flexibility to the object storage environment, and may make the storage extensible, effectively making the storage a platform, according to various embodiments. In other words, a storage may be transformed using a storlet from merely keeping data to producing value from the data.

The architecture of a storlet may include a software engine within various nodes of an object storage environment (e.g., a multi-node object storage environment). An end user may frame the computational algorithm and deploy or pass the computational algorithm to the storlet as a typical object storage request (e.g., a "PUT") operation. A storlet-configured object storage may not require any additional client or a compute node to perform analysis of the data, thus storage nodes or proxy nodes may act as compute nodes and may return results to the user. Various architectures may use virtual machines (VMs), but the architectures may also or instead use Linux containers, Dockers, etc. deployed on the nodes in order to perform various computation tasks or operations. A storlet may be composed of or utilize Linux containers and/or additional middleware.

A storlet scheduler operation or framework may improve computation performance and may reduce workload on a storage unit in a multi-node object storage environment by performing specific workflow changes in the embedded compute engine. This may help in automatic storlet invocation, which may include selecting a node for computation operation execution, according to a classification of computation operations designated for a particular system.

Object storage systems (both traditional object storage and embedded compute engines within object storage systems) may be built using commodity or multi-vendor hardware. Each node may be treated equal, irrespective of its role. The use of commodity hardware for traditional object storage systems may be practical as the object storage may be primarily designed to be low cost storage, but commodity and multi-vendor hardware may generate suboptimal results when used for compute embedded object storage systems.

A storlet scheduler operation or framework may improve computation performance or may reduce workload on the storage unit in a multi-vendor (or commodity) object storage environment by performing specific workflow changes in the embedded compute engine (storlet). Workflow changes may be made according to various hardware architecture values or characteristics. Hardware characteristics may be designated by the hardware manufacturer, or may be received from any other source, including various repositories on the Internet and elsewhere.

A storlet architecture may lack intelligence to select the node for fulfilling a specific type of computation operation, by which the storage unit may be benefited using a file system role performed within the selected node. Lack of a file system role within a storlet-enabled node may result in a substantial increase in disk input/output (I/O) operations and load on the file system, and may also result in a degradation of the storlet enabled nodes storage unit performance, which may reduce the life span of disks involved.

A framework and middleware may help provide sufficient storlet invocation. Invocation may include picking a node for a computation operation execution according to the classification of computation operations assigned for a particular system. The appropriate node may be determined based on the availability of resources.

A storlet engine may support two modes of operation a synchronous mode and an asynchronous mode. The synchronous mode allows the storlet to run within a hypertext transfer protocol (HTTP) request/response that initiated an execution of a computational algorithm. The HTTP request completes after the storlet finishes executing. The asynchronous mode causes the HTTP request that initiated the storlet execution to end as soon as the system registers that the request has reached a queue. The storlet may then run in the background, which may result in an accumulation of results within the queue as the storlet, in asynchronous mode, executes requests in the background. For example, a storlet, running in asynchronous mode, may receive computational algorithms as a request. The storlet may receive the request, issue a reception of the request, and then process the request. Without having to send a result to complete the execution, the storlet may build a queue, and the storlet may control a queue of computational algorithms to be processed. An output of an object storage node may also include information about its completion status. The storlet initiator may then access an output of an object and retrieve the results of the computation.

Objects stored on object storage may include an object ID (OID), and may include metadata/attributes of the object and the data within the object. Once an object is created on a first node, it may be copied to one or more additional nodes, depending on the policies of the object storage environment. Depending on the object storage environment the nodes, may provide redundancy and high availability (HA), and may be within a same data center or may be geographically dispersed.

In a public cloud computing environment, object storage may be accessed over the Internet through a Representational State Transfer (REST) Application Programming Interface (API) (i.e., REST API) over a HTTP. Public cloud service providers may provide APIs to an end user. In a private cloud environment, end users may either develop their own API or use an object storage device (OSD). In general, commands sent over HTTP to object storage may include: "PUT" to create an object, "GET" to read an object, "DELETE" to delete to purge an object and list-to-list objects.

A storlet operating with an equal-treatment model may treat each node participating in the object storage cluster equally irrespective of the qualities (e.g., features) of a server. Features of the object storage clusters may include a type, a model, an operating system, a version, performance evaluation reports, and reliance. The storlet may identify each node with a unique network address (IP address). With an equal-treatment model, the storlet execution step may result in a virtualization unit being instantiated on a node that contains maximum data required for fulfilling a computational algorithm or on a node that contains maximum available hardware resources.

Instead of equally treating each node, a storlet may treat each node unequally. The storlet may unequally treat the nodes based on a feature (or category) of each node. The storlet may use a preferred characteristic of a computational algorithm to determine a node for processing the computational algorithm. A preferred characteristic may include a function of a first node that will allow the node to process a computational algorithm more effectively when compared to a second node. The unequal treatment may include unequally treating the nodes where nodes with different past experiences, service categories, or performance evaluation reports may be selected to process a computational algorithm based on a category of the computational algorithm. In an embodiment, if the nodes are equal, then the storlet may select a node for processing a computational algorithm based on the node with the most available resources. By selecting object storage clusters based on their features, computational algorithms may be processed more efficiently on object storage clusters, which are in an unequal-treatment model programed for the workload. For example, a first object storage cluster may be programed for video rendering. If the computational algorithm is tagged by a user or is determined to have operations pertaining to video rendering, then the computational algorithm may be sent to the first object storage cluster for processing.

By unequally treating nodes based on their features, a determination may be made on anode best suited for handling a computational algorithm. A lack of framework and middleware, which help the storlet to understand the performance evaluation results, performance evaluation reports, certified preferences, or past records etc. for a particular storage node, may result in a poorer performance of the object storage environment. A framework and a middleware may be integrated within a storlet's architecture and assist in determining the node to be used for executing a specified computation workload (e.g., one or more computational algorithms) based on the performance evaluation results(e.g., performance benchmarks), certified preferences, and/or past records in a heterogeneous stack (e.g., hardware and software) variation. The storlet may then select one or more nodes based on the workloads (e.g., computational algorithm inputs) and handle each computational algorithm in the most efficient manner.

The proposed framework may incorporate a daemon operating on each node participating in the object storage cluster and the daemon may collect the features of each node of the object storage cluster. The features may include the hardware, operating system flavors, versions, and other technology features powering the nodes. The daemon may create a look up table of the features of the nodes. The daemon may then export the collected details from each node to a storlet scheduler. The details of each node may be used by the storlet scheduler to identify the underlying node features along with a "role" served by the node (e.g., proxy node or storage node) as well as the category of the node. The capabilities/functions of a node may defined a role of the node and may allow for a node with preferred characteristics to be selected based on each computational algorithm input. The selection of a node based on the computational algorithm input is further described, herein.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Characteristics are as follows:

On-demand self-service: a cloud consumer may unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and may be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via input/output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
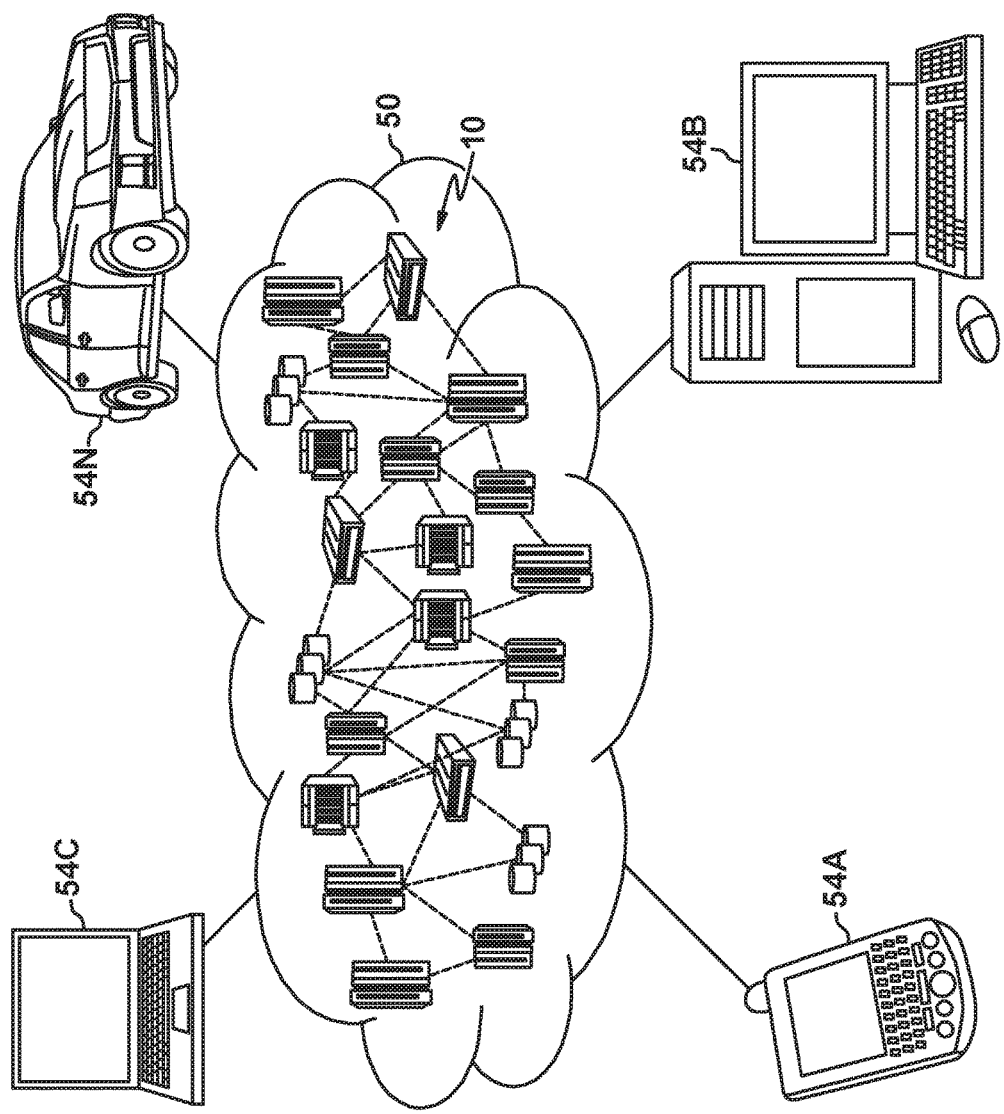
FIG. 2 depicts a cloud computing environment, according to various embodiments of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 may communicate with any type of computerized device over any type of network and/or network addressable connection (e.g., using a web browser).

Figure 3:
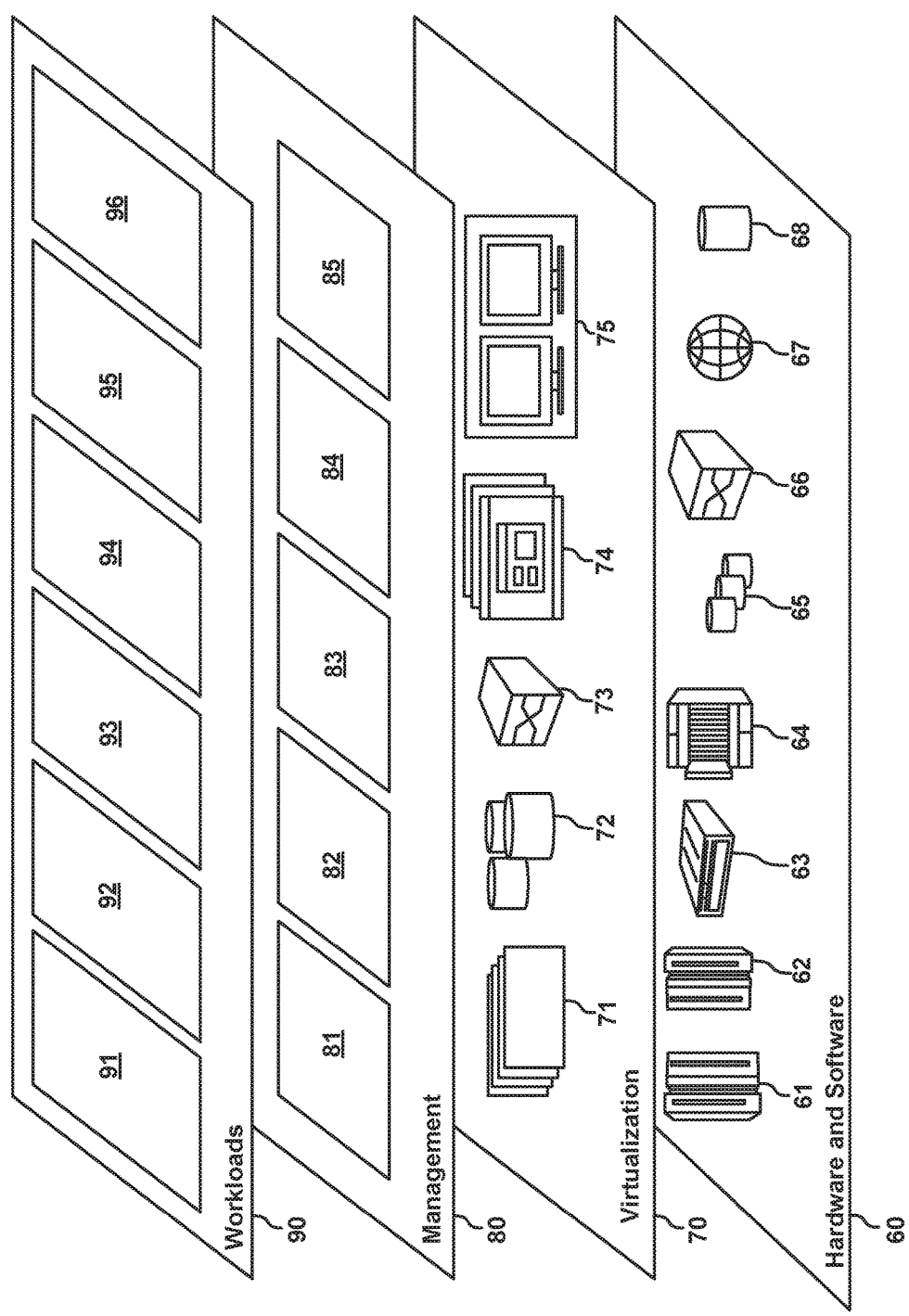
FIG. 3 depicts abstraction model layers, according to various embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96. The mapping and navigation 91 of the workload layer 90 may include a middleware including a storlet for determining an optimal node for processing a computational algorithm.

Figure 4:
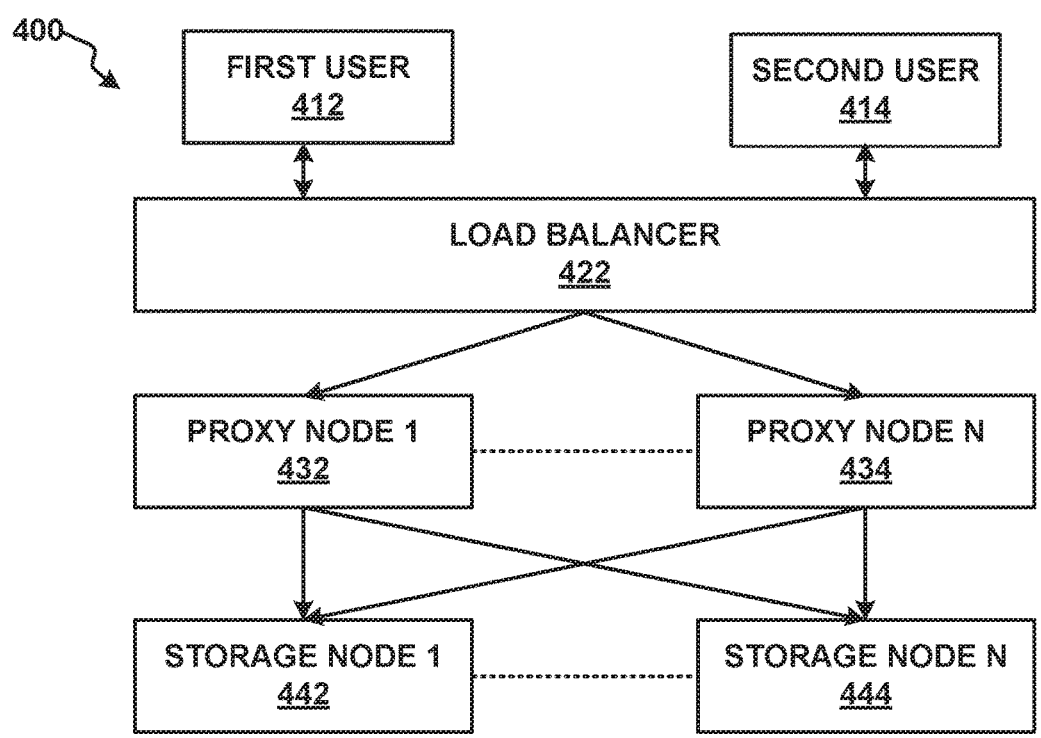
FIG. 4 depicts an object storage architecture, according to various embodiments of the present disclosure.

FIG. 4 depicts an embedded compute engine based on subject storage architecture, according to embodiments. The embedded compute engine 400 may be accessed by one or more users, which may include a first user 412, and a second user 414. The first user 412 and the second user 414 may connect to a load balancer 422. The load balancer 422 may connect to one or more proxy nodes illustrated as a first proxy node (PROXY NODE 1 432) and one or more proxy nodes as an $N^{th}$ proxy node (PROXY NODE N 434). The one or more proxy nodes including the first proxy node 432 and the $N^{th}$ proxy node 434 may connect to one or more storage nodes. The connection between the proxy nodes and the storage nodes may include a first storage node (STORAGE NODE 1 442), and one or more storage nodes as an $N^{th}$ storage node (STORAGE NODE N 444). In various embodiments, each proxy node may be configured to connect to each of the one or more storage nodes. In various embodiments, each proxy node may connect to only a select set of the one or more storage nodes.

In various embodiments, a load balancer may connect directly to a storage node. Instead of the proxy node receiving a computational algorithm from the load balancer and distributing the computational algorithm to a storage node, the load balancer may distribute the computational algorithm directly to a storage node. By directly connecting to the storage node, the load balancer may interact with the storage node in the same manner as the load balancer would with a proxy node.

An object storage architecture may include two entities/node groups. A first node group may be called "proxy nodes" (e.g., the first proxy node 432), which are used for distributed load/request handling in the namespace. A second node group may be called "storage nodes" (e.g., the first storage node 442) which may be responsible for writing to the disks/storage subsystems and may serve as a storage unit/repository for analysis (extracting meaningful information from raw data). By equipping a storage/proxy node with a storlet, the storage/proxy node may analyze the data objects residing within the node, whereas other applications of the object storage architecture may require an additional client or compute node for processing the objects outside a storage/proxy node.

A first user 412 may connect to the load balancer 422 and submit the computational algorithm to the load balancer. The computational algorithm submitted by the first user may be distributed to a proxy node 432 of the one or more proxy nodes. In an example, the load balancer may connect to a first proxy node. The computational algorithm may be received by the proxy node 432 and either processed on the proxy node or distributed to a storage node. The proxy node may then connect to one or more storage nodes and distribute the computational algorithm to a preferred first storage node 442 for the processing of the computational algorithm. In the example, the first proxy node may connect to a first storage node. The storage node 442 may then process the computational algorithm, and send a result of the computational algorithm back to the first user through the first proxy node and load balancer.

Figure 5:
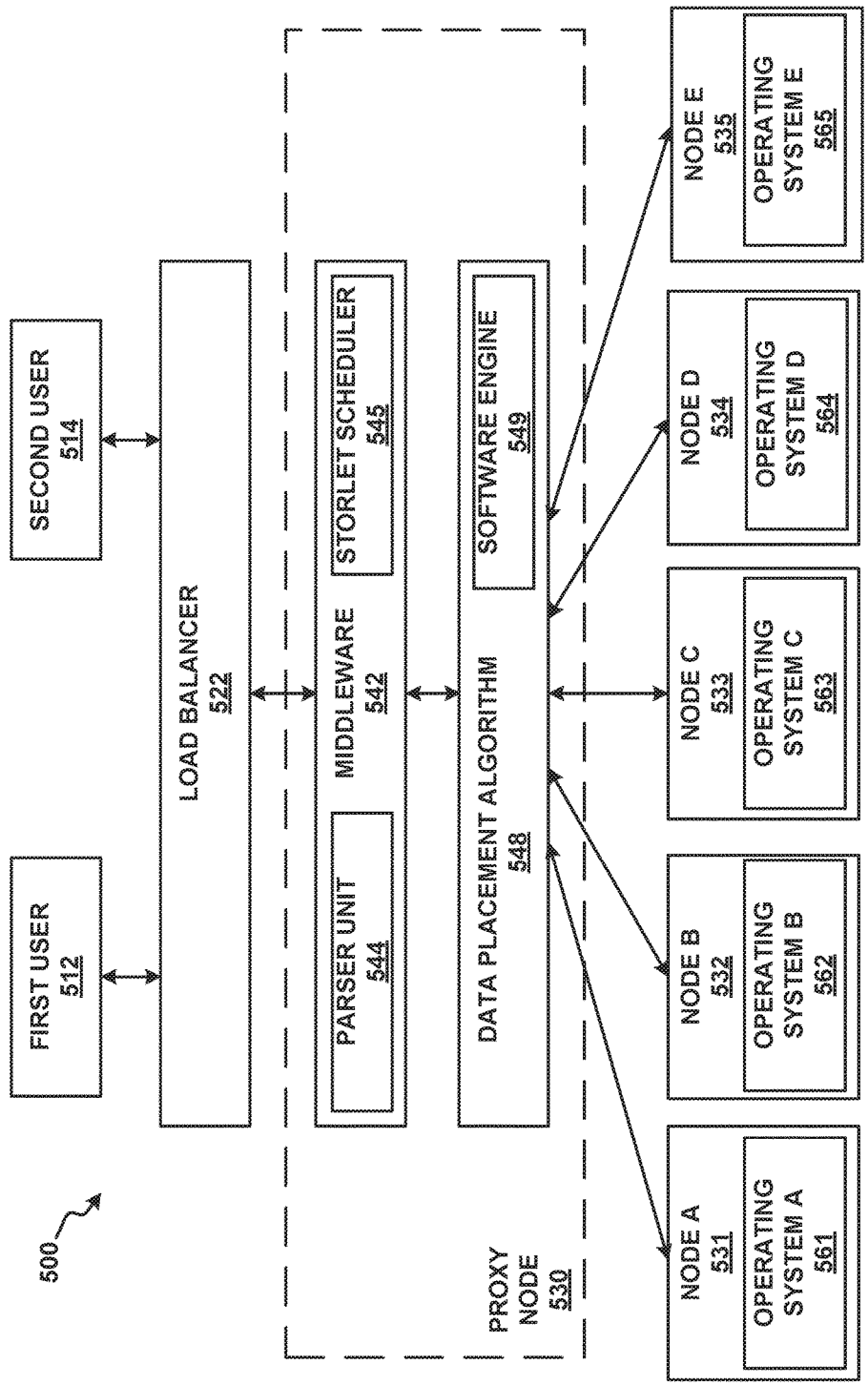
FIG. 5 depicts a heterogeneous object storage environment, according to various embodiments of the present disclosure.

FIG. 5 depicts a heterogeneous object storage environment, according to embodiments. The heterogeneous object storage environment 500 may include a first proxy node (PROXY NODE) 530 connected to one or more nodes 531-535. A computational algorithm may be sent (e.g., by a PUT request) from a first user 512 or a second user 514 to a load balancer 522. The load balancer 522 may connect to one or more proxy nodes including the first proxy node 530. The first proxy node 530 may connect through a data placement algorithm (or ring) 548 to a first node (NODE A) 531, a second node (NODE B) 532, a third node (NODE C) 533, a fourth node (NODE D) 534, and a fifth node (NODE E) 535.

The one or more nodes 531-535 may be heterogeneous in hardware/architecture wherein each node may comprise different hardware resulting in unequal performances between nodes. The heterogeneous node architecture may result in a first node 531 having a better processing/storage performance than a second node 532. Each node of the heterogeneous node architecture may include performance evaluation reports that certify the node for certain workloads (e.g., see FIG. 6). For example, a first node may be a proxy node and may include a first hardware architecture that includes a special CPU architecture, which causes the first node to process arithmetic operations faster, while a second node may be a storage node and include an Application Specific Integrated Chip (ASIC), better suited for video rendering. Each node may be assigned tasks in accordance to the relative strengths of the nodes (e.g., computation operations, categories, past experience, and workload certifications). The first node may be tasked to handle more compute intensive computational algorithms, while the second node may be tasked to handle video/image rendering algorithms.

The data placement algorithm 548 may be a ring. Rings may determine where data should reside within a cluster. Separate rings may be utilized depending on the individual object storage policies of the object storage environment 500. The data placement algorithm 548 as a ring may determine a node for best a storing data object and may also determine the location of each node based on a selection of a node from the storlet enabled middleware 542. The data placement algorithm may receive the computational algorithm from the middleware 542 and distribute the computational algorithm to a node.

This architecture uses virtual machines (e.g., Linux containers, Dockers, or ZeroVM) deployed on the nodes to perform the computation tasks. The one or more nodes 531-535 may include a virtual machine, which may include an operating system. The first node 531 may include a first Operating System (OS) (OPERATING SYSTEM A) 561. The second node 532 may include a second OS (OPERATING SYSTEM B) 562. The third node 533 may include a third OS (OPERATING SYSTEM C) 563. The fourth node 534 may include a fourth OS (OPERATING SYSTEM D) 564. The fifth node 535 may include a fifth OS (OPERATING SYSTEM E) 565. Each operating system may be different in OS or OS flavor and may assist the nodes in processing computational algorithms differently due to the heterogeneity of the node architecture. For example, an Ubuntu version 14.04 OS may be assigned to a first node, and a Red Hat Enterprise Linux (RHEL) version 7 OS may be assigned to a second node.

A storlet scheduler 545 may reside within a middleware 542 of the first proxy node 530. The middleware 542 may connect the load balancer 522 of the heterogeneous object storage environment 500 to an data placement algorithm 548 of the first proxy node 530. The data placement algorithm 548 of the first proxy node 530 may include a software engine 549. A first user 512 may frame a computational algorithm and deploy or pass it to the software engine 549 as an object "PUT" operation. The software engine 549 of the data placement algorithm 548 may not require any additional client or compute node to perform analysis of the data and the software engine 549 may process the computational algorithm on the proxy node 530 or pass the computational algorithm to another node within the heterogeneous object storage environment 500. For example, the data placement algorithm 548 may pass the computational algorithm to the first node 531. The first node 531 may be a storage node with a storlet. The first node 531 may process the computational algorithm and return results of the computational algorithm back to the user.

A parser unit 546 may reside within the middleware 542 of the first proxy node 530. The parser unit 546 may receive a computational algorithm from the load balancer 522 and develop a parse tree (i.e., an abstract syntax tree) of one or more preferred characteristics of the computational algorithm. The abstract syntax tree of the computational algorithm may then be used to determine a node for processing by the storlet scheduler 545. The storlet scheduler 545 may analyze the abstract syntax tree for a node that includes the preferred characteristics of the abstract syntax tree of the computational algorithm. The preferred characteristics may determine the features (e.g., OS flavor, hardware/architecture, category, performance evaluation reports) of a preferred node for processing the computational algorithm. The features of the node may be collected by a daemon stored within each node used to gather the features of the node. The features of the node gathered by the daemon may be compared using the storlet scheduler 545 to the preferred characteristics of a computational algorithm to determine a node for processing the computational algorithm. The storlet scheduler 545 may analyze the features of each node, and the middleware 542, which is the storlet, may compare the features of the node to the abstract syntax tree of the computational algorithm. For example, a computational algorithm may be submitted by a first user. A load balancer 522 may distribute the computational algorithm to a first proxy node 530. A parser unit 544 within the middleware 542 of the first proxy node 542 may create an abstract syntax tree of the computational algorithm and send the abstract syntax tree to a storlet scheduler 545 for determining a node with one or more features matching the preferred characteristics of the computational algorithm for processing the computational algorithm. The storlet scheduler 545 may then determine that the third node 533 connected to the first proxy node 530 is a preferred node for the computational algorithm. The computational algorithm may then be sent to the third node for processing.

Within the heterogeneous object storage environment 500, the one or more nodes 531-535 may include different hardware, operating system flavors (e.g., Ubuntu, Windows, AIX), which may result in different performance evaluation results, certifications, and support matrices. For example, a first user may deploy a computational algorithm to a heterogeneous object storage environment. The heterogeneous object storage environment may include a first Ubuntu 14.04 x86 node, and a second AIX 7 x86 node, both of which have reported a same resource availability. In the example the nodes may be displayed where the first node may be {OS: Ubuntu, Version: 14.04, Hardware: x86, CPU: Intel, is-proxy: True} and the second node may be {OS: AIX, Version: 7.1, Hardware: x86, CPU: AMD, is-proxy: False}. If a storlet engine treats all nodes as equal, the storlet engine may assign Ubuntu 14.04 x86 node for handling this computational algorithm, which in turn has a poor performance evaluations results or poor trust for this type of computational algorithm. Instead, if the storlet engine unequally treats the nodes based on their features, the second AIX 7 x86 node may be selected based on high evaluation results or good trust from a user due to a past experience. The high evaluation results may determine that a better performance of the processing of the computation algorithm may be received from the second AIX 7 x86 node when compared to the first Ubuntu 14.04 x86 node.

In an additional example of the heterogeneous object storage environment, a storlet may determine a node for processing a computational algorithm by the following procedure. A first user may deploy a computational algorithm (e.g., a PUT operation). The computational algorithm may be sent to a first node including a middleware with a parsing unit and a storlet scheduler. The computational algorithm may be parsed into a syntax abstract tree and checked for syntax errors. The abstract syntax tree may be used to determine a computation operation indicator (e.g., arithmetic, plain text to Portable Document Format (PDF), or image editing) of the computational algorithm. The storlet scheduler may be used to determine a node with preferred characteristics for instantiating a virtualization unit on a second node. The computational algorithm may be passed from the first node to the virtualization unit of the second node with the preferred characteristics. The virtualization unit then processes the computational algorithm by pulling/reading/writing data based on one or more steps defined within the computational algorithm. After the virtualization unit processes the computational algorithm, the results may be returned to the first user with code (success/failure) and results.

Figure 6:
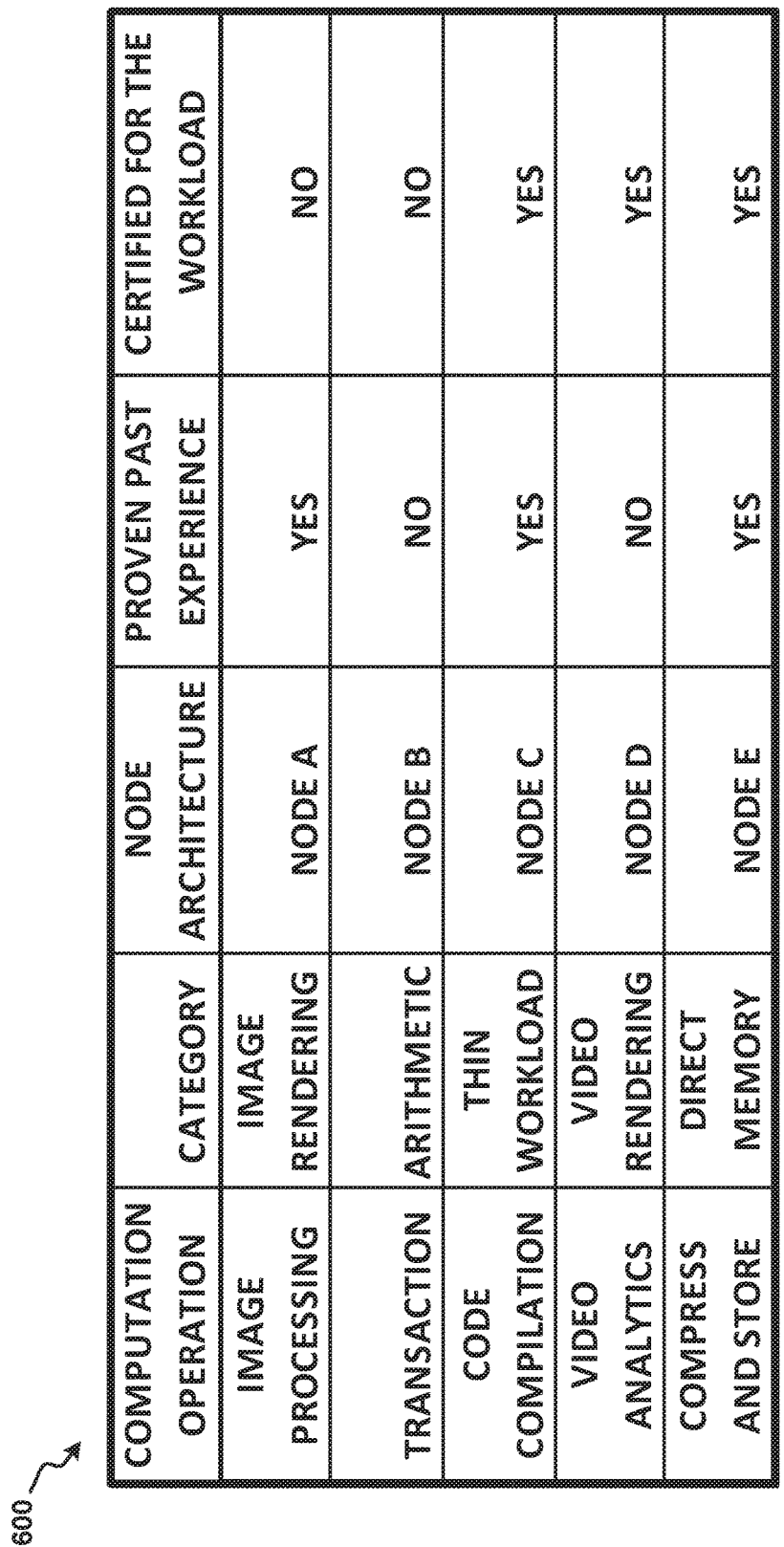
FIG. 6 depicts a table for determining computation operations of one or more nodes, according to various embodiments of the present disclosure.

FIG. 6 depicts a table for determining computation operations, according to various embodiments. The table 600 includes one or more nodes for processing computational algorithms within a heterogeneous object storage environment (FIG. 5). The table 600 may be a lookup table, which may replace runtime computation with an array-indexing operation. The lookup table 600 may include characteristics (e.g., information) of each node such as computation operation, category, node architecture, and determinations on past experience (e.g., performance evaluation reports) and certification for the workload. The lookup table may be generated and stored within a storlet scheduler of a node (e.g., a proxy node). The characteristics of each of the nodes on the lookup table may be generated from a daemon of each of the nodes gathering the characteristics of each of the nodes within the object storage environment.

The characteristics of a node may be used to determine if a node is a preferred node including preferred characteristics for the processing of a computational algorithm. A node may be selected as a preferred node if the node includes a preferred characteristic (or first characteristic), which is similar to the type of computational algorithm to be processed. The type of computational algorithm may be derived from the indicators gathered from an abstract syntax tree. The computational algorithm may be parsed into a sequence of steps and the sequence of steps may be used to determine a preferred node (e.g., a first node) with a preferred characteristic (or first characteristic) for the processing of the computational algorithm. The parsing of the computational algorithm may include a parsing unit, which may break the computational algorithm into a parse tree or an abstract syntax tree. The abstract syntax tree may include an abstract syntactic structure (e.g., results or indicators) of a computational algorithm, where each branch of the abstract syntax tree relates to an indicator within the computational algorithm.

A storlet middleware may enable a hook for an execution cycle of the storlet and may facilitate a provision to determine the category of computational algorithm. The category of the computational algorithm may be deployed by the user as a predefined category or be auto detected using the parsing unit. The parsing unit may also include a manual determination of the category of the computational algorithm, wherein the manual determination includes comparing preferred characteristics from the abstract syntax tree to the characteristics of the nodes within the lookup table 600.

The look up table may keep track of the architecture (e.g., Hardware, OS, technology, features, and/or role) for each node. One or more characteristics may be determined though the parse tree and a node may be selected for the processing of the computational algorithm. Based on the architecture and characteristics of the nodes available for processing, the storlet may then determine an appropriate node for processing the deployed computational algorithm. Each node may include an available resource consideration, which may be a standard comparison of the determined computational algorithm category including a preferred node for processing the computational algorithm. Each node may include a node architecture, a computation operation, a category, a past experience of the category (e.g., workload), and a certification for the workload. In various embodiments, the user may select a node, which may be preprogrammed and inputted to the storlet as a template.

The lookup table 600 includes a first node (NODE A), a second node (NODE B), a third node (NODE C), a fourth node (Node D), and a fifth node (NODE E). The first node, NODE A, includes an image processing computation operation, with an image rendering category. The first node may have past experience processing computational algorithms within the image rendering category, but may not be certified for the workload. The second node, NODE B, includes a transaction processing computation operation, with an arithmetic category. The second node may not have past experience and may not be certified for the arithmetic workload. The third node, NODE C, includes a code compilation operation with a category of thin workload. The third node may have both past experience and certified for the code compilation computation operation. The fourth node, NODE D, includes a video analytics computation operation, with a video rendering category. The fourth node may not have past experience with video analytics, but may be certified for the workload. The fifth node, NODE E, includes a compress and store computation operation, with a direct memory category. The fifth node may have both past experience and be certified for the compress and store computation operation.

In an example, a storlet within a proxy node may receive a computational algorithm to be distributed to a node within matching a first characteristic of the computational algorithm. The computational algorithm may be parsed by a parsing unit and determined to include an abstract syntax tree including the first characteristic of the computational algorithm as a first indicator. If the first characteristic of the computational algorithm includes image rendering, then the computational algorithm may be sent to the first node (NODE A) for processing. In an additional example, if a second computational algorithm is received including a second characteristic of video rendering, then the computational algorithm may be sent to the fourth node (NODE D) for processing.

Figure 7:
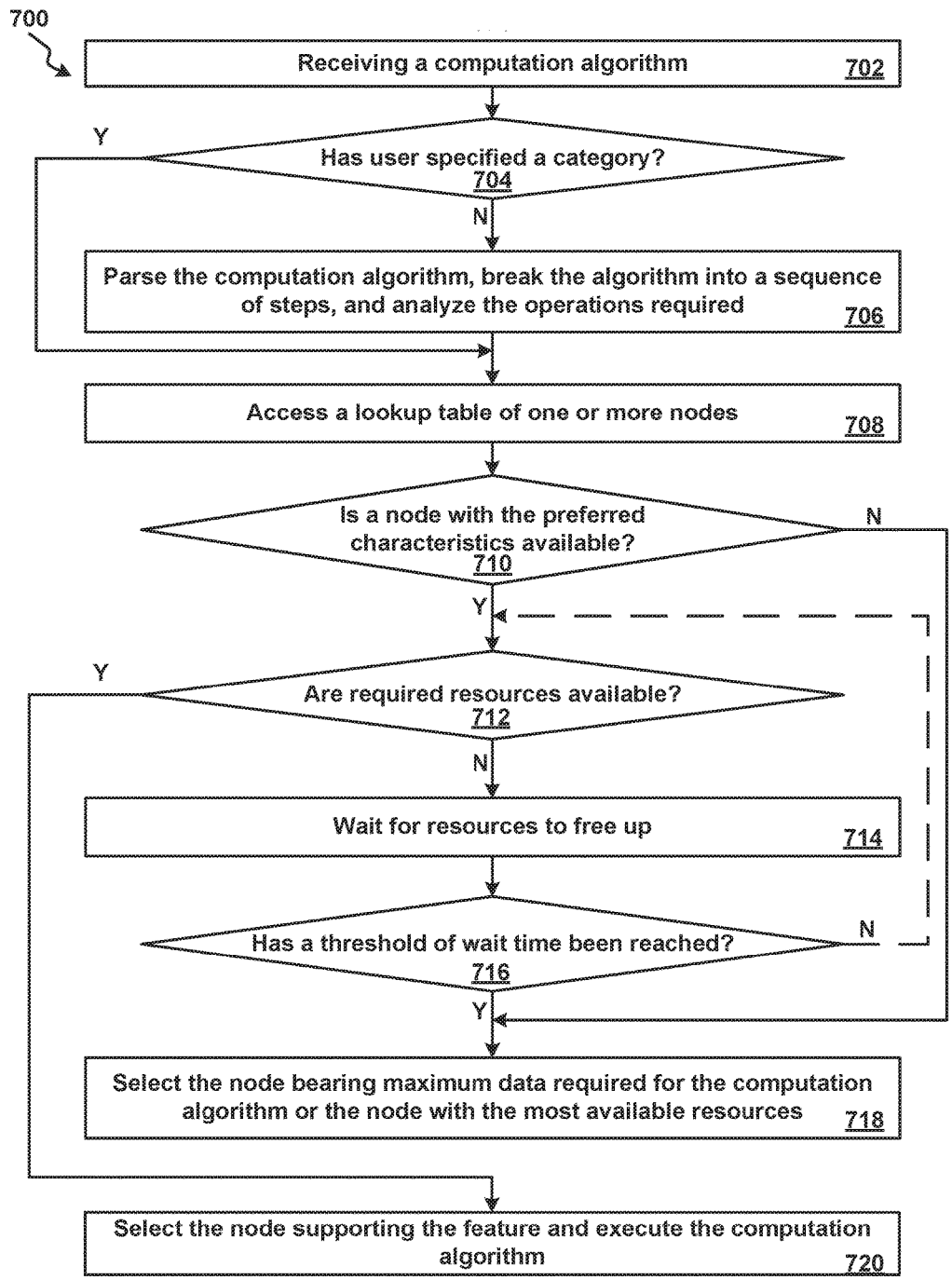
FIG. 7 depicts a flow chart for selecting a node for processing a computational algorithm, according to various embodiments of the present disclosure.

FIG. 7 depicts a flow chart for selecting a node for processing a computational algorithm, according to various embodiments of the present disclosure. The method 700 may be used to determine a node for processing a computational algorithm.

In operation 702, a computational algorithm is received. A computational algorithm may be received from a user (e.g., user 512, FIG. 5). The computational algorithm may be distributed by a load balancer (e.g., load balancer 522, FIG. 5) to a proxy node (e.g., proxy node 530, FIG. 5). The proxy node may include a middleware (e.g., middleware 542, FIG. 5) and a data placement algorithm. The middleware may be a storlet including a parser unit (e.g., parser unit 544, FIG. 5) and a storlet scheduler (e.g., storlet scheduler 545), and the data placement algorithm (e.g., data placement algorithm 548, FIG. 5) may include a software engine (e.g., software engine 549, FIG. 5). The proxy node may receive the computational algorithm and use the storlet for determining a node for processing the computational algorithm.

In decision block 704, a determination may be made on the computational algorithm if a user specified a category for the computational algorithm. When inputting the computational algorithm to the load balancer, the load balancer may receive a specified category from the user for the computational algorithm. The category defined by the user may be used to determine a preferred node for the processing of the computational algorithm based on a first characteristic of the computational algorithm. The category may include features of the computational algorithm or a specific category, which may direct the storlet scheduler to an appropriate node for processing the computational algorithm. If the load balancer receives a category of the computational algorithm, then the method 700 may progress to operation 708. If the load balancer did not receive a category of the computational algorithm, then the method 700 may progress to operation 706.

In an example, the user may define (or indicate) a category of the computational algorithm. The user when inputting the computational algorithm may be prompted to indicate a category for defining the computational algorithm. The computational algorithm may be a mathematics problem to be solved by a node of the object storage environment. The user, when submitting the computational algorithm to a load balancer, may select an "arithmetic" category for the computational algorithm. The load balancer may then distribute the computational algorithm to a proxy node, which may utilize the selected "arithmetic" category to determine a preferred node for processing the computational algorithm.

In operation 706, the computational algorithm may be parsed into an abstract syntax tree. The computational algorithm may be parsed within a storlet of a proxy node. The storlet of the proxy node may include a parser unit, which may perform the parsing operation converting the computational algorithm into the abstract syntax tree. The abstract syntax tree may include a sequence of the steps by which the computational algorithm may be analyzed to determine a function of the computational algorithm. The function of the computational algorithm may be utilized to determine a category of the computational algorithm. For example, branches of the abstract syntax tree may include a portion of code that includes a function of the computational algorithm. If the function is an arithmetic operation to be computed by the storlet, then the storlet may select a preferred node for processing the computational algorithm.

In operation 708, a lookup table including one or more nodes may be accessed. The lookup table may be accessed by the storlet of the proxy node. The lookup table may include the categories of each node connected to the proxy node. The categories of the nodes may be compared to the user-defined category, or the category determined though the abstract syntax tree. The storlet scheduler may maintain the lookup table of the one or more nodes, which may be accessed by the storlet.

In decision block 710, a determination is made on an availability of the node with the preferred characteristics. A node with preferred characteristics (or first characteristic) may include a category matching the determined or inputted category of the computational algorithm. A node with the first characteristic may also include a node with a computation operation matching the computational algorithm. If a node matching the first characteristic is available, then the method 700 may progress to operation 712. If a node matching the first characteristic is not available, then the method 700 may progress to operation 718.

In decision block 712, a determination is made on an availability of resources of the preferred node. Each node may include one or more resources. The resources of the preferred node may provide the resources for processing the computational algorithm. The resources may include a threshold of the processing power of the node. Each node may include a threshold of the resources, which may be represented as a percentage of a total processing power, a core consumption, or a processing time consumption. If the resource of the node reaches the threshold, then the node may be considered unavailable and the method 700 may progress to operation 714. For example, the threshold may be set at 90% of a total processing power of a node and the processing power may be 91%. Since the processing power is greater than the threshold, the computational algorithm may not yet be processed on the preferred node. If the resource of the node does not reach the threshold, then the node may be considered available and the method 700 may progress to operation 720. For example, the threshold may be set at 90% of a total processing power of a node and the processing power may be 80%. Since the processing power has not reached the threshold, the computational algorithm may be processed on the preferred node.

In operation 714, the storlet engine may wait for the node to free up. If the node is currently unavailable, then the storlet engine may wait until the resources of the preferred node are available before processing the computational algorithm on the preferred node. The storlet engine may pause the processing of the computational algorithm and wait for a predetermined time for resources to free up before checking if a threshold of the wait time of the unavailable node has been reached. For example, the storlet engine may wait ten seconds until checking if the threshold of the wait time has been reached.

In decision block 716, a determination is made to determine if a threshold of the wait time has been reached (or exceeded). The threshold of the wait time may be set based on a number of checks of the predetermined wait time, or may be based on a total time waited. If the threshold of the wait time is reached, then the method 700 may progress to operation 718. For example, the threshold of the wait time may be thirty seconds. If the storlet engine waits for three ten-second intervals, then the threshold of the time limit may be reached. If the threshold of the wait time is not reached, then the method 700 may return to operation 712, where the method will check again to see if the required resources are available. For example, the threshold of the wait time may be thirty seconds. If the storlet engine has only waited for two ten-second intervals, then the threshold of the time limit may not yet be reached and the storlet engine may check if the required resources are available.

In operation 718, a node is selected for processing the computational algorithm. A node that is not the preferred node may be selected if the computational algorithm has waited longer than the wait time threshold, or does not match a category of the one or more nodes. The computational algorithm may be processed by a node with the most available resources (e.g., maximum data required for the computational algorithm). For example, two nodes are available and connected to the proxy node with the storlet engine, a first node with 75% of total processing power consumed and a second node with 80% of total processing power consumed. If either the first or the second nodes are preferred nodes for the computational algorithm, then the computational algorithm may be processed on the first compute node.

In operation 720, the node with the first characteristic is selected as the preferred node, and the computational algorithm is executed (e.g., processed) on the preferred node. If the storlet selects a preferred node of the one or more nodes to process the computational algorithm, then the computational algorithm may be sent to the node and processed on the node. After processing, the computational algorithm may be returned to the user with the results generated by the processing of the computational algorithm.

In various embodiments, the node with the preferred characteristics may be a proxy node. The proxy node may include one or more additional storage nodes connected to the proxy node. The proxy node may host the preferred characteristics of the one or more storage nodes hosted by the proxy node. If the proxy node is selected as the preferred node, then the proxy node may implement the method 700 again to determine which node included the preferred characteristics matching the category of the computational algorithm.

The present disclosure may be a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks. These computer readable program instructions may also be stored in a computer readable storage medium that can direct a computer, a programmable data-processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data-processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   monitoring a first storlet engine for a first computational algorithm, wherein the storlet engine includes:
   a daemon operating on one or more nodes, the daemon:
   collecting node details from the one or more nodes, and
   exporting the collected details to a storlet scheduler, the storlet scheduler identifying, based on the collected details, characteristics of the one or more nodes,
   a lookup table for storing the characteristics of the one or more nodes, the characteristics comprising a workload certification, a computation operation, a category, a node architecture, and performance evaluation reports of the node,
   a parser unit configured to break down computational algorithms, and a resource availability monitor configured to monitor a workload of the one or more nodes;

parsing, using the parser unit, the first computational algorithm into an abstract syntax tree;
determining, by analyzing the abstract syntax tree, a first category of the first computational algorithm;
identifying, based on the first category of the computational algorithm, a first node of the lookup table with a first characteristic matching the first category for processing the first computational algorithm; and
sending the first computational algorithm to the first node for processing.

2. The method of claim 1, further comprising:
determining an availability of the first node for processing the first computational algorithm; and
sending, in response to the first node not being available, the first computational algorithm to a second node of the one or more nodes.

3. The method of claim 2, wherein sending the first computational algorithm to the second node of the one or more nodes further comprises:
determining that the workload of the first node is not available for processing the first computational algorithm;
pausing the processing of the first computational algorithm as a wait time;
setting a time threshold for the wait time of the first computational algorithm; and
sending, in response the first computational algorithm reaching the time threshold, the first computational algorithm to the second node of the one or more nodes.

4. The method of claim 3, wherein the second node is selected based on a determination of a maximum data required for fulfilling the first computational algorithm.

5. The method of claim 3, wherein the second node is selected based on a determination that the second node contains available hardware resources.

6. The method of claim 3, further comprising:
determining that the wait time of the first computational algorithm has not reached the wait time threshold;
determining that the first node is available for processing the first computational algorithm; and
sending, in response to the first node being available, the first computational algorithm to the first node.

7. The method of claim 1, further comprising:
receiving an indication from a user defining an indicated category of the first computational algorithm; and
replacing the first category of the computational algorithm with the indicated category of the first computational algorithm.

8. The method of claim 1, wherein the first node is a proxy node in communication with one or more storage nodes.

9. The method of claim 8, wherein the proxy node accesses one or more storage nodes for processing the computational algorithm.

10. A system, comprising:
a memory;
a processor device communicatively coupled to the memory;
a parser unit configured to:
parse a first computational algorithm into an abstract syntax tree; a proxy node communicatively coupled to the processor device and the memory wherein the proxy node includes a first storlet engine, and the proxy node is configured to:
monitor the first storlet engine for the first computational algorithm, where the storlet engine includes:
a daemon operating on one or more nodes, the daemon:
collecting node details from the one or more nodes, and
exporting the collected details to a storlet scheduler, the storlet scheduler identifying, based on the collected details, characteristics of the one or more nodes,
a lookup table for storing the characteristics of the one or more nodes, the characteristics comprising a workload certification, a computation operation, a category, a node architecture, and performance evaluation reports of the node,
a parser unit configured to break down computational algorithms, and a resource availability monitor configured to monitor a workload of the one or more nodes;
determine, by analyzing the abstract syntax tree, a first category of the first computational algorithm;
identify, based on the first category of the computational algorithm, a first node of the lookup table with a first characteristic matching the first category for processing the first computational algorithm; and
send the first computational algorithm to the first node.

11. The system of claim 10, wherein the storlet engine of the proxy node is further configured to:
determine an availability of the first node for processing the first computational algorithm; and
send, in response to the first node not being available, the first computational algorithm to a second node of the one or more node.

12. The system of claim 11, wherein the storlet engine of the proxy node is further configured to:
determine that the workload of the first node is not available for processing the first computational algorithm;
pause the processing of the first computational algorithm as a wait time;
set a time threshold for the wait time of the first computational algorithm; and
send, in response the first computational algorithm reaching the time threshold, the first computational algorithm to the second node of the one or more nodes.

13. The system of claim 12, wherein the second node is selected based on a determination of a maximum data required for fulfilling the first computational algorithm.

14. The system of claim 12, wherein the second node is selected based on a determination that the second node contains available hardware resources.

15. A computer program product for selecting a first node for processing a computational algorithm within a storage environment, the storage environment comprising a computer readable storage medium having a computer readable application stored therein, wherein the computer readable application, when executed on a computing device, causes the computing device to:
monitor a first storlet engine for a first computational algorithm, where the storlet engine includes:
a daemon operating on one or more nodes, the daemon:
collecting node details from the one or more nodes, and
exporting the collected details to a storlet scheduler, the storlet scheduler identifying, based on the collected details, characteristics of the one or more nodes,
a lookup table for storing the characteristics of the one or more nodes, the characteristics comprising a workload certification, a computation operation, a category, a node architecture, and performance evaluation reports of the node,
a parser unit configured to break down computational algorithms, and a resource availability monitor configured to monitor a workload of the one or more nodes;

parse, using the parser unit, the first computational algorithm into an abstract syntax tree; determine, by analyzing the abstract syntax tree, a first category of the first computational algorithm;

identify, based on the first category of the computational algorithm, a first node of the lookup table with a first characteristic matching the first category for processing the first computational algorithm; and send the first computational algorithm to the first node.

16. The computer program product of claim 15, wherein the computing device is further configured to:

determine an availability of the first node for processing the first computational algorithm; and send, in response to the first node not being available, the first computational algorithm to a second node of the one or more node.

17. The computer program product of claim 16, wherein the computing device is further configured to:

determine that the workload of the first node is not available for processing the first computational algorithm;

pause the processing of the first computational algorithm as a wait time;

set a time threshold for the wait time of the first computational algorithm; and send, in response the first computational algorithm reaching the time threshold, the first computational algorithm to the second node of the one or more nodes.

18. The computer program product of claim 17, wherein the second node is selected based on a determination of a maximum data required for fulfilling the first computational algorithm.

19. The computer program product of claim 17, wherein the second node is selected based on a determination that the second node contains available hardware resources.

* * * * *